United States Patent
Suresh

(10) Patent No.: US 12,250,659 B2
(45) Date of Patent: Mar. 11, 2025

(54) METHODS AND SYSTEMS FOR TRACKING OF ASSETS AND USER NAVIGATION

(71) Applicant: Hand Held Products, Inc., Charlotte, NC (US)

(72) Inventor: Sandeep Suresh, Bangalore (IN)

(73) Assignee: Hand Held Products, Inc., Charlotte, NC (US)

(*) Notice: Subject to any disclaimer, the term of this patent is extended or adjusted under 35 U.S.C. 154(b) by 0 days.

(21) Appl. No.: 18/500,884

(22) Filed: Nov. 2, 2023

(65) Prior Publication Data

US 2024/0064695 A1 Feb. 22, 2024

Related U.S. Application Data

(62) Division of application No. 17/305,621, filed on Jul. 12, 2021, now Pat. No. 11,843,934.

(30) Foreign Application Priority Data

May 28, 2021 (IN) .............................. 202111023794

(51) Int. Cl.
*H04W 4/02* (2018.01)
*G01S 3/48* (2006.01)
(Continued)

(52) U.S. Cl.
CPC ............ *H04W 64/006* (2013.01); *G01S 3/48* (2013.01); *G01S 5/04* (2013.01); *G01S 5/08* (2013.01); *H04W 4/029* (2018.02)

(58) Field of Classification Search
CPC ....... H04W 64/006; H04W 4/029; G01S 3/48; G01S 5/04; G01S 5/08
See application file for complete search history.

(56) References Cited

U.S. PATENT DOCUMENTS 10,809,370 B2 10/2020 Kim et al.
10,992,419 B1* 4/2021 Zhou ..................... H04L 1/0618
(Continued)

FOREIGN PATENT DOCUMENTS

CN 110333478 A 10/2019
CN 108226862 B 11/2020

OTHER PUBLICATIONS

Belloni, F. (Oct. 9-10, 2019). Smart Buildings Show. Olympia, Washington. London, England (21 pages). Retrieved on Oct. 6, 2021 from https://smartbuildingsshow.com/content-images/speakers/12-15-D1-Controls-Fabio-Belloni.pdf, Oct. 6, 2021.
(Continued)

*Primary Examiner* — Dai Phuong
(74) *Attorney, Agent, or Firm* — Alston & Bird LLP

(57) ABSTRACT

A location system for determining a position of a device is described here. The location system comprises a memory and a processor, the processor executes the computer-executable instruction to perform operations. The operations include sending a first instruction to a locator beacon to determine a first location of the device based on angle of arrival calculation of a first set of one or more packets received from the device. The operations further include sending a second instruction to the device to determine a second location of the device based on angle of departure calculation of a second set of one or more packets received from the locator beacon. Furthermore, the operation includes receiving the first location from the locator beacon and receiving the second location from the device. The operations further include determining the position of the device based on a function of the first location and the second location.

18 Claims, 8 Drawing Sheets

(51) Int. Cl.
  *G01S 5/04* (2006.01)
  *G01S 5/08* (2006.01)
  *H04W 4/029* (2018.01)
  *H04W 64/00* (2009.01)

(56) References Cited

U.S. PATENT DOCUMENTS

| | | | |
|---|---|---|---|
| 11,228,469 | B1 | 1/2022 | Shpak |
| 2019/0033420 | A1 | 1/2019 | Knaappila |
| 2019/0306805 | A1 | 10/2019 | Hasnain et al. |
| 2019/0306824 | A1* | 10/2019 | Chu ................... H04B 7/0452 |
| 2020/0318983 | A1* | 10/2020 | Shirani-Mehr ........ G06V 20/56 |
| 2020/0400777 | A1 | 12/2020 | Lentsch et al. |
| 2021/0105169 | A1* | 4/2021 | Choi ....................... H04L 67/04 |
| 2021/0396830 | A1 | 12/2021 | Knaappila |
| 2022/0036254 | A1* | 2/2022 | Varughese ............. G07B 15/00 |
| 2022/0146693 | A1* | 5/2022 | Nakagawa ............... G08G 1/20 |
| 2022/0322085 | A1 | 10/2022 | De et al. |
| 2022/0397408 | A1* | 12/2022 | Bahnsen ............ G01C 21/3484 |
| 2023/0118031 | A1 | 4/2023 | Cai et al. |
| 2023/0309056 | A1* | 9/2023 | Li .............................. G01S 1/08 |

OTHER PUBLICATIONS

European search report Mailed on Jul. 25, 2022 for EP Application No. 22161643, 9 page(s).

European Search Report Mailed on Jul. 27, 2022 for EP Application No. 22160737.

Examiner Interview Summary Record (PTOL-413) Mailed on Aug. 3, 2023 for U.S. Appl. No. 17/305,621, 1 page(s).

Non-Final Rejection Mailed on Feb. 1, 2023 for U.S. Appl. No. 17/305,621.

Notice of Allowance and Fees Due (PTOL-85) Mailed on Aug. 3, 2023 for U.S. Appl. No. 17/305,621, 8 page(s).

U.S. Appl. No. 17/305,621, filed Jul. 12, 2021, U.S. Pat. No. 11,843,934, Issued.

* cited by examiner

METHODS AND SYSTEMS FOR TRACKING OF ASSETS AND USER NAVIGATION

CROSS-REFERENCE TO RELATED APPLICATIONS

This application is a divisional of U.S. patent application Ser. No. 17/305,621, filed Jul. 12, 2021, which claims priority to and the benefit of foreign Indian Provisional Patent Application Serial No. 202111023794,filed on May 28, 2021 with the Government of India Patent Office and entitled "Methods And Systems For Tracking Of Assets And User Navigation," each of which is incorporated herein by reference in its entirety.

TECHNOLOGICAL FIELD

Example embodiments described herein relate generally to systems, methods, and apparatuses for asset tracking and real-time navigation.

BACKGROUND

In commercial building, retail store, construction sites, warehouses, fulfillment centers, hospitals, etc., it is increasingly desirable for a system to be capable of performing an indoor positioning, asset tracking, people tracking, geofencing and navigation. There are multiple technologies that can be employed to perform the tracking and the navigation, but they might face various challenges of accuracy, power consumption, etc.

SUMMARY

The following presents a simplified summary to provide a basic understanding of some aspects of embodiments described herein. This summary is not an extensive overview and is intended to neither identify key or critical elements nor delineate the scope of such elements. Its purpose is to present some concepts of the described features in a simplified form as a prelude to the more detailed description that is presented later.

Various example embodiments described herein relate to a location system configured to determine a position of a device, the location system comprising: a memory to store computer executable instructions and, a processor to execute the computer-executable instruction to perform operations. The operations can include sending a first instruction to a locator beacon to determine a first location of the device based on angle of arrival calculation of a first set of one or more packets received from the device. The operations can further include sending a second instruction to the device to determine a second location of the device based on angle of departure calculation of a second set of one or more packets received from the locator beacon. The first instruction and the second instruction coordinate the angle of arrival calculation and the angle of departure calculation to occur at different times. Furthermore, the operations can include receiving the first location from the locator beacon and receiving the second location from the device. The operations further include determining the position of the device based on a function of the first location and the second location.

According to some example embodiments, a beacon comprising a processor configured to operate in one or more operation modes, a first transceiver communicatively coupled to the processor and a second transceiver communicatively coupled to the processor. The first transceiver and the second transceiver are configured to transmit and receive one or more packets The processor is configured to direct, in a first operation mode of the one or more operation modes, the first transceiver to receive a first set of one or more packets from a first electronic device present within a predefined range of the beacon. Further, the processor is configured to direct, in a second operation mode of the one or more operation modes, the second transceiver to transmit a second set of one or more packets to a second electronic device present within the predefined range of the beacon.

According to some example embodiments, a method comprising directing, by a processor of a beacon operating in a first operation mode, to a first transceiver to receive a first set of one or more packets from a first electronic device present within a predefined range of the beacon. Further, the method includes directing, by the processor operating in a second operation mode, to a second transceiver to transmit a second set of one or more packets to a second electronic device present within the predefined range of the beacon.

The above summary is provided merely for purposes of summarizing some example embodiments to provide a basic understanding of some aspects of the disclosure. Accordingly, it will be appreciated that the above-described embodiments are merely examples and should not be construed to narrow the scope or spirit of the disclosure in any way. It will be appreciated that the scope of the disclosure encompasses many potential embodiments in addition to those here summarized, some of which will be further described below.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DETAILED DESCRIPTION

Figure 1:
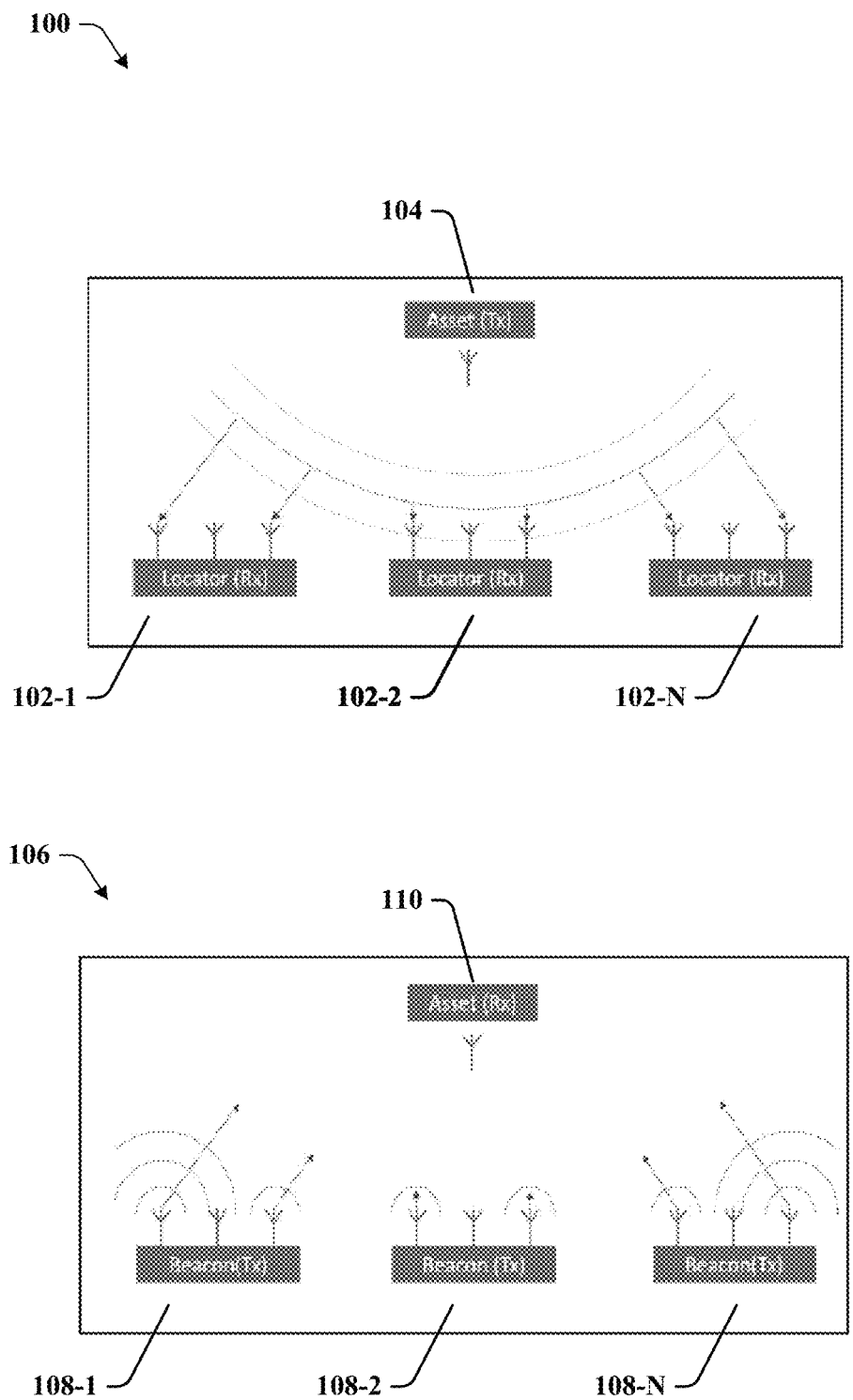
FIG. 1 illustrates schematic diagrams illustrating an AoA and an AoD working principle, according to one or more embodiments described herein.

Some embodiments of the present disclosure will now be described more fully hereinafter with reference to the accompanying drawings, in which some, but not all embodiments of the disclosure are shown. Indeed, the disclosure may be embodied in many different forms and should not be construed as limited to the embodiments set forth herein; rather, these embodiments are provided so that this disclosure will satisfy applicable legal requirements. The terms "or" and "optionally" are used herein in both the alternative and conjunctive sense, unless otherwise indicated. The terms "illustrative" and "exemplary" are used to be examples with no indication of quality level. Like numbers refer to like elements throughout.

Unless the context requires otherwise, throughout the specification and claims which follow, the word "comprise" and variations thereof, such as, "comprises" and "comprising" are to be construed in an open sense, that is as "including, but not limited to."

The term "electronic device" used hereinafter refers to any or all of, handheld devices, mobile phones, wearable devices, personal data assistants (PDAs), portable devices, electronic tags, beacons, BT locators, tablet computers, smart books, palm-top computers, barcode readers, scanners, indicia readers, imagers, Radio-frequency identification (RFID readers or interrogators), vehicle-mounted computers, wearable barcode scanners, wearable indicia readers, a point of sale (POS) terminal, headset devices, programmable logic controllers (PLCs), programmable automation controllers (PACs), industrial computers, laptop computers, desktop computers, personal computers, and similar electronic devices equipped with at least a processor configured to perform the various operations described herein.

The term "electronically coupled," "coupled", "electronically coupling," "electronically couple," "in communication with," "communicatively coupled," or "connected" in the present disclosure refers to two or more components being connected (directly or indirectly) through wired means (for example but not limited to, system bus, wired Ethernet) and/or wireless means (for example but not limited to, Wi-Fi, Bluetooth, ZigBee), such that data and/or information may be transmitted to and/or received from these components.

The term "antenna array element" is used herein to correspond to a device or apparatus (for example, an active element) that may be configured to generate radio frequency (RF) signals when a voltage signal is applied at the antenna element. For example, the antenna element may be configured to generate RF signal in high frequency (HF) band. Additionally, or alternatively, the antenna element may generate the RF signal in the ultra-high frequency (UHF) band. Additionally, or alternatively, the antenna element may generate the RF signal in other frequency band(s). In some examples, the antenna element may further comprise a matching circuit that, for example, is electronically coupled to the active element to generate the RF signals. The antenna arrays can have a variety of designs and numbers of antennae, for example but not limited to a linear array, rectangular array, or a circular array.

The components illustrated in the figures represent components that may or may not be present in various embodiments of the disclosure described herein such that embodiments may comprise fewer or more components than those shown in the figures while not departing from the scope of the disclosure.

Generally, in a highly populated environment, such as warehouses, fulfilment centers, retail stores, it can be desirable to implement real-time location systems or indoor location systems to perform asset tracking, people tracking, geofencing and navigation. Locators can be employed inside the warehouse, for example, at various locations. These locators can perform the tracking and the navigation to track tags associated with the assets and navigate users through the warehouse. The locator, in an example, may operate in different modes depending on the need of a user. In an example embodiment, the locator might operate in a first mode for performing the tracking and geofencing operations. The locator can then switch to another mode for performing the navigation. The modes of the locator may not be limited to the one mentioned above.

In an example (e.g. in populated environment), it can be desirable for the locator to operate in both the modes simultaneously, thereby, enabling the locator to perform the tracking and navigation at the same time.

In an embodiment, the tracking and the navigation of the tag associated with the asset by the locator can be performed using a Bluetooth (BT) technology. Various versions of the BT technology can be employed here, for example but not limited to, BLE (Bluetooth low energy) 5.1. The BLE 5.1 relies on two methods called as an angle of arrival (AoA) and an angle of departure (AoD).

In an alternate embodiment, the tracking and the navigation can be performed using Ultra wide-band (UWB) technology. Technologies used for the tracking and the navigation may not be only limited to Bluetooth or UWB technologies. Various other technologies can be employed such as wireless fidelity (WiFi), light fidelity (LiFi), wireless gigabit alliance (WiGig), ZigBee, near field communication (NFC), magnetic secure transmission, radio frequency (RF), Ultrasound, 5G mm wave technology, sound waves, etc.

However, in some situation, using UWB technology for the tracking and navigation might not be accurate. The UWB technology might suffer from higher current consumption and reduced battery life. The BT technology provides an advantage of low current consumption, and hence can be employed easily. Therefore, the present disclosure can provide an efficient method of performing tracking and navigation using a BLE 5.1 enabled locator. Communication between the tag and the locator can include at least one of 3rd generation (3G), long term evolution (LTE), 4th generation (4G), 5th generation (5G), wireless fidelity (WiFi), light fidelity (LiFi), wireless gigabit alliance (WiGig), Bluetooth, Bluetooth low energy (BLE), ZigBee, near field communication (NFC), magnetic secure transmission, radio frequency (RF), or body area network (BAN). However, the disclosure is not limited to the examples, and all available wireless communication technologies may be used as the communication using the second communication. Details of various example embodiments are described in reference to FIGS. 1-8 hereinafter.

The various embodiments are described herein using the term "computing platform" or "master device" used interchangeably for the purpose of brevity. The term "computing platform" can be used herein to refer to any computing device or a distributed network of computing device capable of functioning as a server, such as a master exchange server, web server, mail server, document server, or any other type of server. A computing platform may be a dedicated computing device or a computing device including a server module (e.g., running an application which may cause the computing device to operate as a server). A server module (e.g., server application) may be a full function server module, or a light or secondary server module (e.g., light or secondary server application) that is configured to provide synchronization services among the dynamic databases on computing devices. A light server or secondary server may be a slimmed-down version of server type functionality that can be implemented on a computing device, such as a smartphone, thereby enabling it to function as an Internet server (e.g., an enterprise e-mail server) only to the extent necessary to provide the functionality described herein.

In some example embodiments, the computing platform may correspond to any of, an industrial computer, a cloud computing-based platform, an external computer, a stand-alone computing device, and/or the like. In some example embodiments, the master device or the computing platform, can also refer to any of the electronic devices, as described herein. In some example embodiments, the computing platform can include an access point or a gateway device that can be capable of communicating directly with one or more electronic devices and can also be capable of communicating (either directly or alternatively indirectly via a communication network such as the Internet) with a network establishment service (e.g. Internet service provider). In some example embodiments, the computing platform can refer to a server system that can manage the deployment of one or more electronic devices throughout a physical environment. In some example embodiments, the computing platform may refer to a network establishment service including distributed systems where multiple operations are performed by utilizing multiple computing resources deployed over a network and/or a cloud-based platform or cloud-based services, such as any of a software-based service (SaaS), infrastructure-based service (IaaS) or platform-based service (PaaS) and/or like.

Referring now to FIG. 1, illustrated is a system 100 and 106 representing working principle of the angle of arrival (AoA) and the angle of departure (AoD) methods respectively, according to an example embodiment.

In an example embodiment, the system 100 representing the AoA method can include an asset 104 and a plurality of locators 102-1 to 102-N. The term "asset" used hereinafter can be referred as tags, nodes, electronic portable devices, mobile devices, etc. In the AoA method, the asset 104 works as a transmitter and the plurality of locators 102-1 to 102-N work as receivers. In the AoA method, a device to which direction is being determined, for example, the asset (tag) 104 in an RTLS (Real-time location system) solution, can transmit a special direction finding signal using one or more antennas. The receiving device, such as the locators 102-1 to 102-N in that same RTLS solution, might be having multiple antennae arranged in an array. As the transmitted signal crosses the array, the locators 102-1 to 102-N detect a signal phase difference due to the difference in distance from each of the antenna in its array to the transmitting antenna. The locators 102-1 to 102-N can take In-phase and Quadrature (IQ) samples of the signal while switching between the active antenna in the array. Based on the IQ sample data, the locators 102-1 to 102-N can calculate the relative signal direction. In this way, the AoA method of direction finding can be intended for use with the RTLS as well as proximity solutions, such as item finding, geofencing, people tracking and point of interest (PoI) information services.

In another example embodiment, the system 106 representing the AoD method can include an asset 110 and a plurality of locators 108-1 to 108-N. As mentioned earlier, the term "asset" used hereinafter can be referred to as tags, nodes, electronic portable devices, mobile devices, etc. In the AoD method, the asset 110 works as a receiver and the plurality of locators 108-1 to 108-N work as transmitters. In the AoD method, a device to which direction is being determined, such as the locators 108-1 to 108-N can transmit a special signal using multiple antennae arranged in an array. The receiving device, such as an asset (for example, mobile phone) 110, has one or more antennas. As the multiple signals from the locators 108-1 to 108-N cross the antenna in the asset 110, the asset 110 takes IQ samples. Based on the IQ sample data, the asset 110 can calculate the relative signal direction. Thus, the AoD method of direction finding can be intended to use in IPS (Indoor positioning system) solutions, such as for wayfinding and navigation.

The locators 102-1 to 102-N and 108-1 to 108-N referred herein can correspond to locators mounted at strategic locations in a work environment. In the work environment, such as a warehouse, each locator of the locators (102-1 to 102-N and 108-1 to 108-N) can communicate with the tags associated with the assets (104, 110) in the warehouse. In one or more embodiments, the assets which are present within a predefined range or in vicinity of the locators (102-1 to 102-N or 108-1 to 108-N) can communicate with the locators. The communication can be direct bi-directional communication using one or more communication protocols such as, but are not limited to, Wi-Fi, Bluetooth, Bluetooth low energy (BLE), Zigbee, Ultrasonic frequency based network, and Z-Wave.

In yet another embodiment, the assets (104, 110) can also communicate with the locators (102-1 to 102-N or 108-1 to 108-N) via a network. In this regard, the network can include any wired or wireless communication network including, for example, a wired or wireless local area network (LAN), personal area network (PAN), metropolitan area network (MAN), wide area network (WAN), or the like, as well as any hardware, software and/or firmware required to implement it (such as, e.g., network routers, etc.). For example, the network can include a cellular telephone, an 802.11, 802.16, 802.20, and/or WiMax network. In some embodiments, the Bluetooth may be used to communicate between the devices. Further, the network can include a public network, such as the Internet, a private network, such as an intranet, or combinations thereof, and may utilize a variety of networking protocols now available or later developed including, but not limited to TCP/IP based networking protocols.

In some example embodiments, the locators (102-1 to 102-N or 108-1 to 108-N) may each be implemented as a computing device, such as a personal computer and/or other networked device, such as a cellular phone, tablet computer, mobile device, point of sale terminal, inventory management terminal etc. The depiction in FIG. 1 of "N" members is merely for illustration purposes. In one embodiment, the locators (102-1 to 102-N or 108-1 to 108-N) may be configured to interact with a server (not shown), for example, a position engine. Further, in another embodiment, the locators (102-1 to 102-N or 108-1 to 108-N) can communicate with the server via a gateway.

Figure 2:
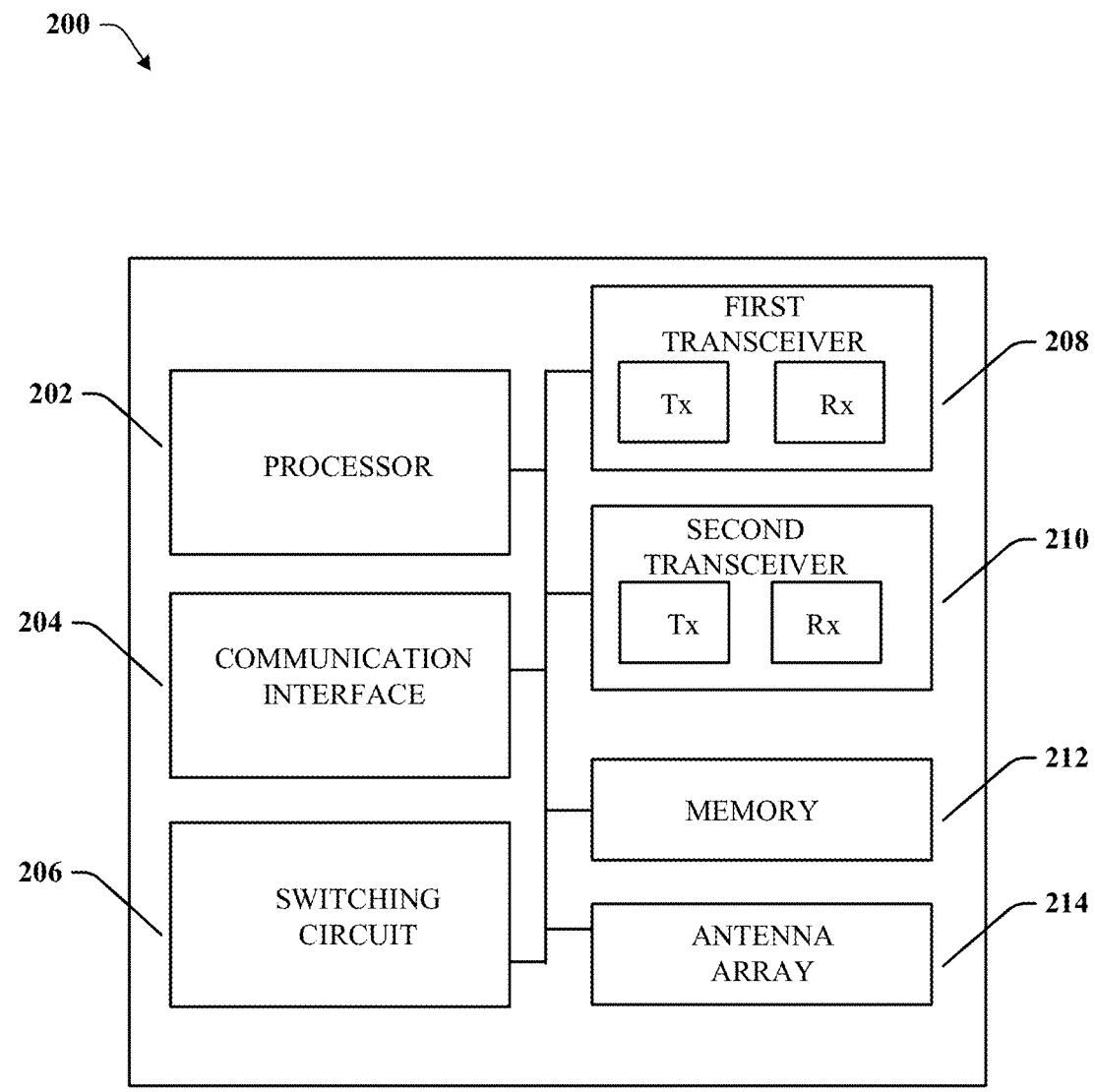
FIG. 2 illustrates a schematic block diagram of a locator beacon, in accordance with one or more embodiments of the present disclosure.

FIG. 2 illustrates a schematic block diagram of a locator beacon 200 (shown in FIG. 1 as 102-1 to 102-N or 108-1 to 108-N). The locator beacon 200 can include a processor 202, a communication interface 204, a switching circuit 206, a first transceiver 208, a second transceiver 210, a memory 212, and an antenna array 214, in accordance with the present disclosure. In an alternate embodiment, the first transceiver 208 and the second transceiver 210 each can also include a transmitter and a receiver (shown in FIG. 2) for enabling communication between the locator beacon 200 and other devices.

The memory 212 can be any type of storage medium that can be accessed by the processor 202 to perform various examples of the present disclosure. For example, the memory 212 can be a non-transitory computer-readable medium having computer-readable instructions (e.g., computer program instructions) stored thereon that are executable by the processor 202 to broadcast packets via at least one of a transmitter and receive response packets via at least one of a receiver. Additionally, the processor 202 can execute the executable instructions stored in memory 212 to switch between different modes of operation, such as an AoA (angle of arrival) mode and an AoD (angle of departure) mode by performing a set of algorithms stored in the memory 212. In some embodiments, the locator beacon 200 may also include a rechargeable or long life battery, one or more speakers, Bluetooth® antenna, UWB antenna and printed circuit board assembly (PCBA) electronics.

The memory 212 can be volatile or nonvolatile memory. The memory 212 can also be removable (e.g., portable) memory, or non-removable (e.g., internal) memory. For example, the memory 212 can be random access memory (RAM) (e.g., dynamic random access memory (DRAM) and/or phase change random access memory (PCRAM)), read-only memory (ROM) (e.g., electrically erasable programmable read-only memory (EEPROM) and/or compact-disc read-only memory (CD-ROM)), flash memory, a laser disc, a digital versatile disc (DVD) or other optical storage, and/or a magnetic medium such as magnetic cassettes, tapes, or disks, among other types of memory.

The processor 202 may be embodied as means including one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, but not limited to, an application specific integrated circuit (ASIC) or field programmable gate array (FPGA), or some combination thereof.

Further, although the memory 212 is illustrated as being located within the locator beacon 200, embodiments of the present disclosure are not so limited. For example, the memory 212 can also be located internal to another computing resource (e.g., enabling computer-readable instructions to be downloaded over the Internet or another wired or wireless connection).

As described above, the processor 202 of the locator beacon 200 can activate and deactivate the first transceiver 208 and the second transceiver 210 based on the mode of operation. In an example embodiment, the first transceiver 208 can be active at a time while the second the transceiver 210 is inactive, or vice-versa. In some scenario, both the first transceiver 208 and the second transceiver 210 may be active simultaneously. The first transceiver 208 can include a first transmitter and a first receiver. The second transceiver 210 can include a second transmitter and a second receiver. In some cases, only one transceiver is active at a time while in some other scenario, both the transceivers can be active concurrently. The selection of mode of operation, i.e. either in the AoA mode or the AoD mode or in both the modes, may be determined based on receiving a command or a trigger signal from the asset. The asset, in this case, can be a mobile device present within the predefined range of the locator beacon 200. The trigger signal from the mobile device can be at least one of a button being pressed, selecting an option on a display such as "SELECT NAVIGATION", or etc.

In the AoA mode of operation, the locator beacon 200 may operate in a receive mode while in the AoD mode of operation, the locator beacon 200 may operate in a transmit mode. In this regard, to operate in different modes, the processor 202 can also perform IQ sample processing and conversion of signals received from the asset (shown in FIG. 1 as 104) in terms of angle, azimuth, and elevation. The term "IQ sample" corresponds to processing the received signals by taking a number of phase and amplitude measurements at precise intervals.

The processor 202 can be couped to the switching circuit 206. The switching circuit 206, in some examples, can be not but limited to an RF switch matrix. The RF switch matrix is an array of RF switches arranged to route radio frequency (RF) signals between multiple inputs and multiple outputs. In another example embodiment, the switching circuit 206 may include a discrete switch matrix made up of discrete electronic components.

The locator beacon 200 can further include the antenna array 214 that aids in the transmission and the reception of packets. In the AoA mode, the asset 104 may include one or more antennas to transmit packets to the locators 102-1 to 102-N having an array of antennas (shown in FIG. 1). Similarly, as shown in FIG. 1, in the AoD mode, the beacons 108-1 to 108-N can comprise multi-antenna array to transmit packets to an asset 110 comprising one or more antennas. Angle calculation in AoA/AoD can be based on phase information from the individual antenna elements of the antenna array 214.

The switching circuit 206 can control the antenna array 214 elements by dynamically switching the array elements based on different modes of operation. For example, in the AoA mode, the switching circuit 206 can allocate a set of array elements (for example, 0-32 antenna array 214 elements) to operate in the AoA mode. Similarly, when the mode is switched from the AoA mode to the AoD mode, the the switching circuit 206 can allocate another set of array elements (for example, 32-63 antenna array 214 elements) to operate in the AoD mode. In this way, the antenna array 214 can support the locator beacon 200 to operate in both the AoA and the AoD modes simultaneously.

Figure 3:
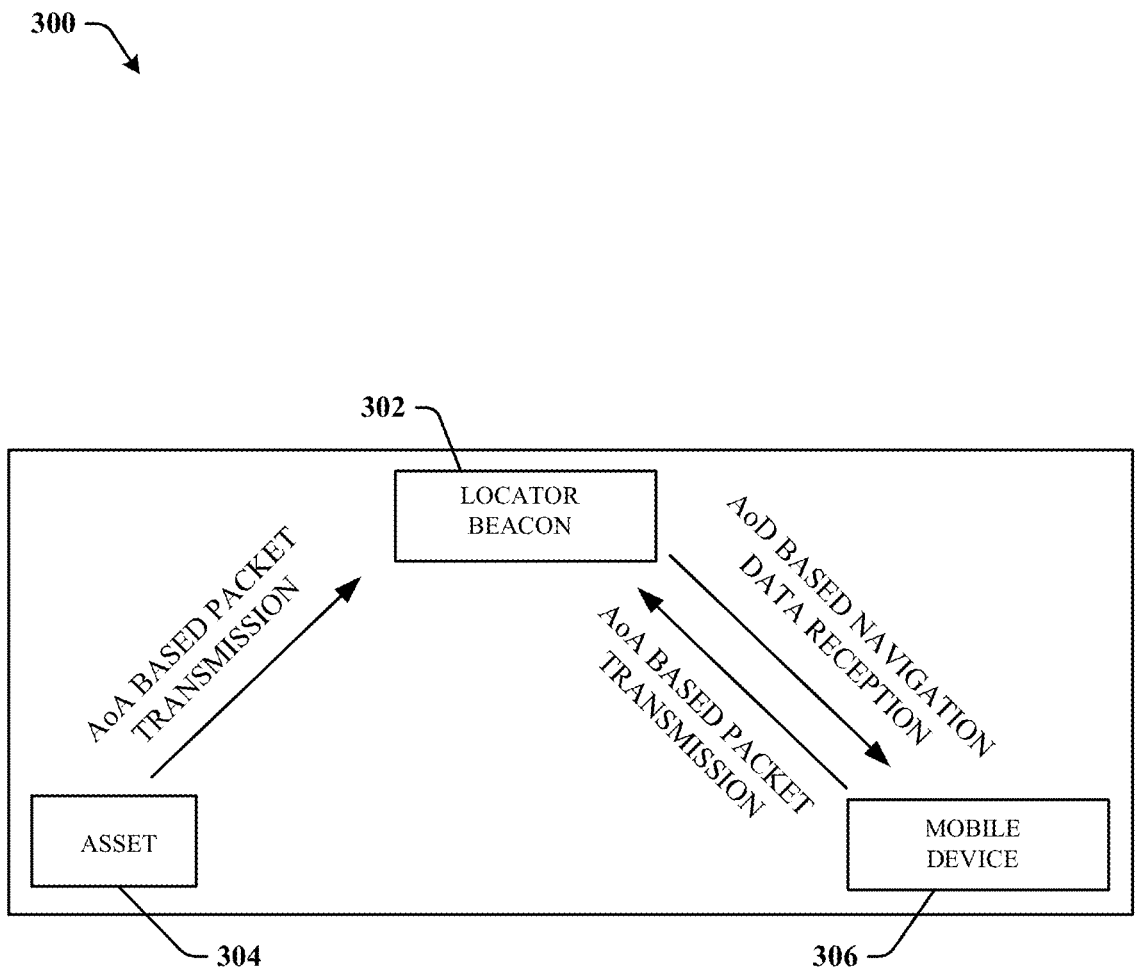
FIG. 3 illustrates a block diagram of a system environment, according to one or more embodiments described herein.

FIG. 3 illustrates a block diagram of a system environment 300, according to one or more embodiments described herein. In the embodiment illustrated in FIG. 3 with reference to FIG. 1, where the system 100 and 106 representing the AoA and AoD working principle includes the assets (104, 110), and the plurality of locators (102-1 to 102-N and 108-1 to 108-N). As explained with regards to FIG. 1, the assets (104, 110) can be referred to as nodes, tags, mobile devices, or any other electronic devices. In one or more embodiments, the system 300 can include the asset 304 (shown in FIG. 1 as 104, 110), the locator beacon 302 (shown as the locators 102-1 to 102-N and 108-1 to 108-N in FIG. 1) and a mobile device 306. In some examples, the mobile device 306 can be the asset 304. The mobile device 306 and the asset 304 may comprise a tag associated with them. The tag, in some examples, can be integrated within the mobile device 306 or the asset 304. In some cases, the tag can be attached with the mobile device 306 or the asset 304 externally via a fastener. The tag associated with the mobile device 306 or the asset 304 can communicate with the mobile device 306, the asset 304, or the locator beacon 302 through at least one of a wireless fidelity (WiFi), Bluetooth, Bluetooth low energy (BLE), Zigbee, Ultrasonic frequency based network, light fidelity (LiFi), wireless gigabit alliance (WiGig), near field communication (NFC), magnetic secure transmission, radio frequency (RF), Ultrasound, 5G mm wave technology, etc.

In accordance with an exemplary embodiment, the warehouse or distribution center, "n" number of the locator beacon 302 can be implemented at different strategic locations. The locator beacons 302 can receive number of advertisement packets from "n" number of assets present in vicinity of the the locator beacon 302. Each asset may have a unique ID, for example, each tag associated with the asset can include a unique tag ID that uniquely identifies the tag. In some examples, the locator beacons 302 can receive data from one or more electronic devices present within its predefined range. The locator beacons 302 can uniquely identify the tag associated with the asset 304 or the one or more electronic device.

In accordance with some example embodiments, as explained earlier in FIG. 2, in the AoA mode of operation, the locator beacon 200 may operate in the receive mode while in the AoD mode of operation, the locator beacon 200 may operate in the transmit mode. Thus, in the AoA mode of operation, the asset 304 can transmit packets to the locator beacon 302 which might be operating in the receive mode. Based on the AoA calculation, the locator beacon 302 can track the asset 304 by determining a relative location of the asset 304. In this regards, the asset 304 communicating with the locator beacon 302 may be present with the predefined range of the locator beacon 302. The predefined range can be few meters, for example but not limited to, 2-3 meters. In some examples, this determined location data of the asset 304 can be stored in database or a remote server for tracking purpose. In yet another embodiment, the location data can be stored internally in the memory of the locator beacon 302. When the locator beacon 302 receives a navigation request from the mobile device 306 which is present within the predefined range of the locator beacon 302, the locator beacon 302 starts to function in the AoD mode. Now, the locator beacon 302 can operate both in the AoA mode and the AoD mode simultaneously so as to track the asset 304 and provide navigation data to reach to the asset 304. As explained already, in the AoD mode of operation, the locator beacon 302 operate in the transmit mode. Thus, the locator beacon 302 on receiving the navigation request, transmits packets consisting of navigation data to the mobile device 306. The navigation data can include information pertaining to a current location of the mobile device 306, a destination location, the asset 304 location, or etc. The mobile device 306 can easily navigate through the work environment to reach to the asset 304. The navigation data may also include displaying a path, a map, or a shortest route on a display of the mobile device 306 to reach to the destination location from the current location of the mobile device 306. In this way, in the work environment, a worker having the mobile device 306 can easily navigate to reach to the asset 304 location to perform a given workflow task. In one or more example embodiment, the navigation data to navigate through the work environment can be provided to the user via different visualization technologies, such as an augmented reality (AR), a virtual reality (VR), and/or a mixed reality (MR). The navigation information can be presented to the user via at least one or more of the above-mentioned visualization techniques. In this regard, any electronic device supporting the above-mentioned visualization techniques can display the navigation information to the user in real-time or near-real time, thereby, enhancing the user experience and interaction, further providing the user with the real-time assistance.

In yet another example embodiment, the mobile device 306 itself can act as an asset having a tag associated with the mobile device 306. The locator beacon 302, by default, operates in the AoA mode and receives the packets from the mobile device 306 to determine a position of the mobile device 306. The mobile device 306 can transmit the packets to the locator beacon 302 for determining a first location of the mobile device 306 relative to the locator beacon 302. The first location herein referred as a location corresponding to an asset tracking information, or a geofencing information. Now, when the locator beacon 302 receives a navigation request from the mobile device 306 present within the predefined range, the locator beacon 302 may start to operate in the AoD mode. In the AoD mode of operation, the locator beacon 302 determines a second location of the mobile device 306 and transmits navigation data to the mobile device 306. The navigation data corresponds to the current location of the mobile device 306 from where its transiting to another location. In this way, based on the first location and the second location of the mobile device 306, an accurate position can be determined in form of navigation and tracking information. In some examples, the locator beacon 302 can transmit the navigation data of the mobile device 306 to a supervisor device (not shown in figures). This enables a supervisor to track a movement of the worker having the mobile device 306. In some examples, the tracking and navigation information can be displayed on a dashboard of a server or can be displayed on the display of the mobile device 306. Hence, this improves the overall efficiency and productivity of the worker during a workflow task execution.

Figure 4:
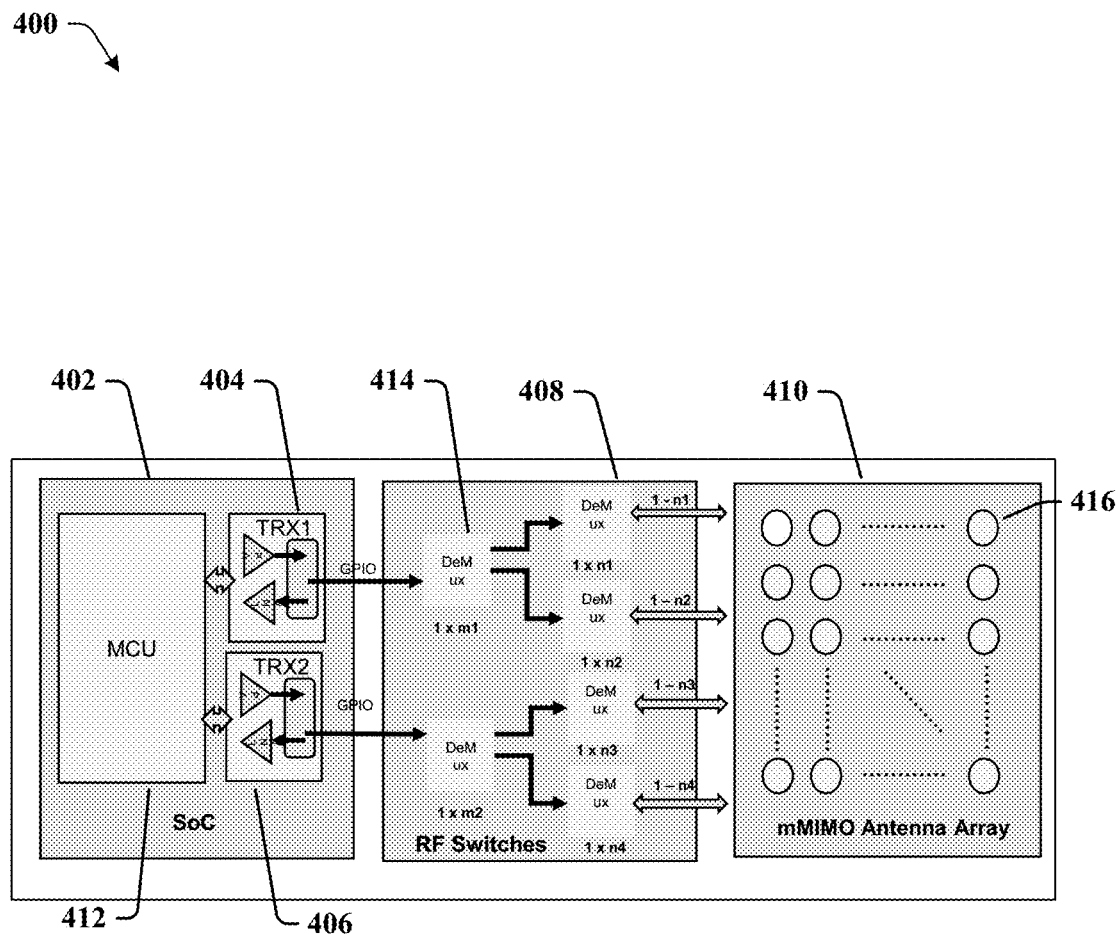
FIG. 4 illustrates an AoX architecture of a locator beacon, according to an example embodiment.

FIG. 4 an AoX architecture of a locator beacon 400, according to one or more embodiments described herein. As already described in FIG. 2, the locator beacon 200 (shown in FIG. 2 as 200) can operate either in the AoA mode or in the AoD mode. Further, as already discussed, the locator beacon 200 can operate in both modes simultaneously which is termed here as "AoX mode of operation". In the AoX mode, both the AoD mode and the AoD modes are active.

In the embodiment illustrated in FIG. 4, the processor 402 (shown in FIG. 2 as 202) of the locator beacon 400 can be referred in FIG. 4 as System On-chip (SoC) comprising bi-directional buses, a pair of transceivers (404, 406), a micontroller unit (MCU) 412, a general purpose Input-Output line (GPIO). The MCU 412 connects with the pair of transceivers (404, 406) via the bidirectional bus cables. The GPIO lines can be unidirectional lines to provide signal to the switching circuit 408 (shown in FIG. 2 as 206). The first transceiver 404 and the second transceiver 406 forms an integrated part of the processor 402 that enables the locator beacon 400 to support the AoX mode of operation.

In the AoA mode of operation, the first transceiver 404 is active and the second transceiver 406 is inactive. The locator beacon 400 operates in the receive mode as a first transmitter of the first transceiver 404 is OFF while a first receiver of the first transceiver 404 is ON.

In the AoD mode of operation, the first transceiver 404 is inactive and the second transceiver 406 is active. The locator beacon 400 operates in the transmit mode as a second transmitter of the second transceiver 406 is ON while a second receiver of the second transceiver 406 is OFF.

In the AoX mode of operation, the first transceiver 404 and the second transceiver 406 both are active simultaneously so as to perform tracking as well as navigation of the asset in the warehouse.

The switching circuit 408 can include a pair of demultiplexers 414 that takes a single input line and routes it to one of several digital output lines. The demultiplexers 414 receives signals from the processor 402 via the GPIO line and routes the output signals to a next set of demultiplexers which in turn may produce several output lines. The output of the switching circuit 408 can be inputted to the antenna array 410 (shown in FIG. 2 as 214).

The antenna array 410 comprises of "n" number of array elements 416. The number "n" may depend upon the design requirement and usage of the antenna array 410. As explained earlier in FIG. 1, in the AoA mode, the asset 104 may include one or more antennas to transmit packets to the locators 102-1 to 102-N having an array of antennas (shown in FIG. 1). Similarly, in the AoD mode, the beacons 108-1 to 108-N can comprise multi-antenna array to transmit packets to the asset 110 having one or more antennas. Angle calculation in AoA/AoD can be based on phase information from the individual antenna elements 416 of the antenna array 410. The arrays utilized for this purpose can be but not limited to, uniform rectangular arrays. The antenna array 410 design herein can be a 4×4array, 3×3array, or a like. For exemplary explanation, the antenna array 410 can be a 64 mMIMO (Massive multiple-input multiple-output) antenna array that may comprise 64 transmitters and 64 receivers.

As already discussed above, the switching circuit 408 can control the antenna array elements 416 by dynamically switching the antenna array elements 416 based on the different modes of operation. For example, in the AoX mode, the locator beacon 400 operates both in the AoA mode and the AoD mode. Thus, to support both the modes, the switching circuit 408 can allocate 0-32 antenna array elements 416 to operate in the AoA mode. Similarly, the the switching circuit 408 can allocate 32-63 antenna array elements 416 to operate in the AoD mode. In this way, the antenna array 410 can support the locator beacon 400 to operate in both the AoA and the AoD modes simultaneously, i.e. in the AoX mode.

As explained already in FIG. 3, "n" number of the locator beacon 400 can be positioned at different strategic locations. The locator beacons 400 can receive number of advertisement packets from "n" number of assets present in vicinity of the the locator beacon 400. In some examples, the locator beacons 400 can receive data from the one or more electronic devices present within its predefined range. The locator beacons 400 can uniquely identify the tag associated with the one or more electronic device. The locator beacon 400 receives the packets from the one or more electronic devices via a Bluetooth interface. By default, the locator beacon 400 operates in the AoA mode, i.e. the receive mode. In some embodiments, the default mode can be the AoD mode as well. The locator beacon 400 operating in the AoA mode receives the packets from the one or more electronic devices. Each packets include an access code, a header, and payload bits. The header bits can represent the unique tag ID data of the tag associated with the transmitting electronic device. The payload bits can include data and one bit of the payload can be reserved for the operation mode selection. For example, the payload bits of the packet transmitted by the one or more electronic device may comprise of an "AoD bit" to enable or disable the AoD mode of operation. When the AoD bit is HIGH, it indicates the locator beacons 400 to activate the AoD mode of operation. In the default mode, the AoD bit is kept LOW and the locator beacons 400 operates in the AoA mode of operation.

When the locator beacons 400 operates in a first mode, i.e., the AoA mode, the first transceiver 404 is active while the second transceiver 406 is inactive. When the first transceiver 404 is active, the first receiver of the first transceiver 404 can be in active state or ON state whereas the first transmitter can be inactive. Thus, the packets from a first electronic device (such as a tag associated with the asset 304) can be received by the locator beacons 400. The antenna array 410 can operate for receiving the packets. Based on the AoA calculation on the packets received from the first electronic device, a first location of the first electronic device can be determined by the locator beacons 400. The first location can correspond to tracking or geofencing information.

In an instance, if the packet transmitted from a second electronic device (such as the mobile device 306) has the AoD bit HIGH (i.e. AoD=1), then the locator beacons 400 starts to operate in a second mode, i.e. the AoD mode. When the locator beacons 400 operates in the second mode, i.e., the AoA mode, the first transceiver 404 is inactive while the second transceiver 406 is active. When the second transceiver 406 is active, the second receiver of the second transceiver 406 can be in inactive state or OFF state whereas the second transmitter can be in active or ON state. Thus, the packets to the second electronic device can be transmitted by the locator beacons 400. Based on the AoD calculation on the packets transmitted to the second electronic device, a second location of the second electronic device can be determined by the locator beacons 400. The second location can correspond to navigation information to reach to a destined location, for example, to the first location of the asset. The AoD mode can be deactivated by transmitting the packet with AoD bit LOW, i.e. AoD=0.

In an example embodiment, the locator beacons 400 on receiving the trigger signal, i.e. AoD=1, the locator beacons 400 starts to operate in the AoX mode. The term "AoX mode" herein refers to a hybrid mode in which the locator beacon 400 supports both the AoA and the AoD mode simultaneously. In the AoX mode, both the the first transceiver 404 and the second transceiver 406 can be active, thereby, providing the tracking, geofencing and navigation data. The packets from the first electronic device can be received by the first transceiver 404 of the locator beacon 400 while the second transceiver 406 transmits the packets to the second electronic device. The first transceiver 404 may ignore any packets or data transmitted from the second transceiver 406 so as to avoid ambiguity.

In above explanation, the first electronic device here may not be limited to the asset and the second electronic device may not be limited to the mobile device. In one embodiment, the first electronic device and the second electronic device can be the asset. In another embodiment, the first electronic device and the second electronic device can be the mobile device.

Figure 5:
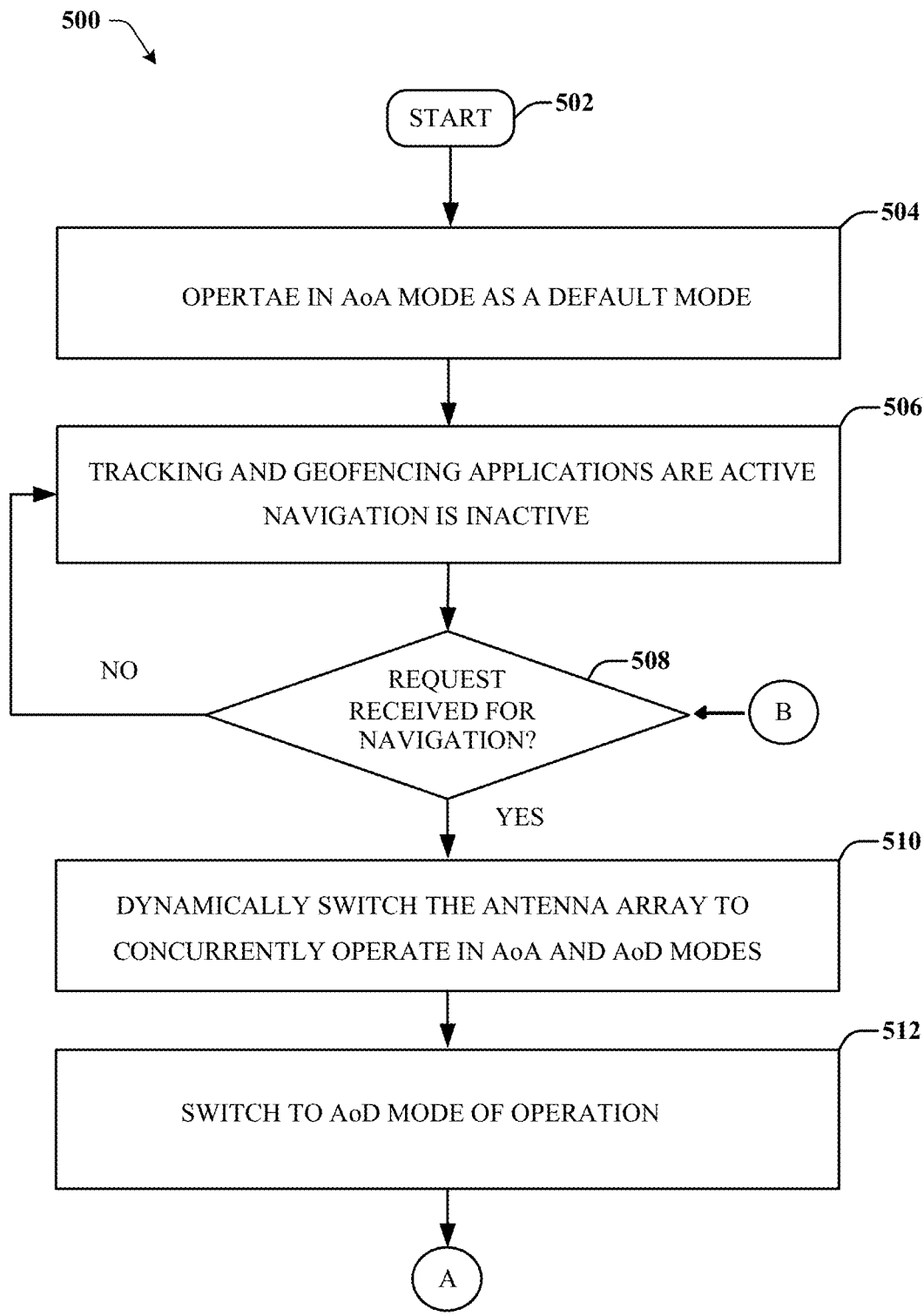
FIGS. 5-6 illustrate a flow diagram illustrating steps of operation in different modes, according to one or more embodiments described herein.
Figure 6:
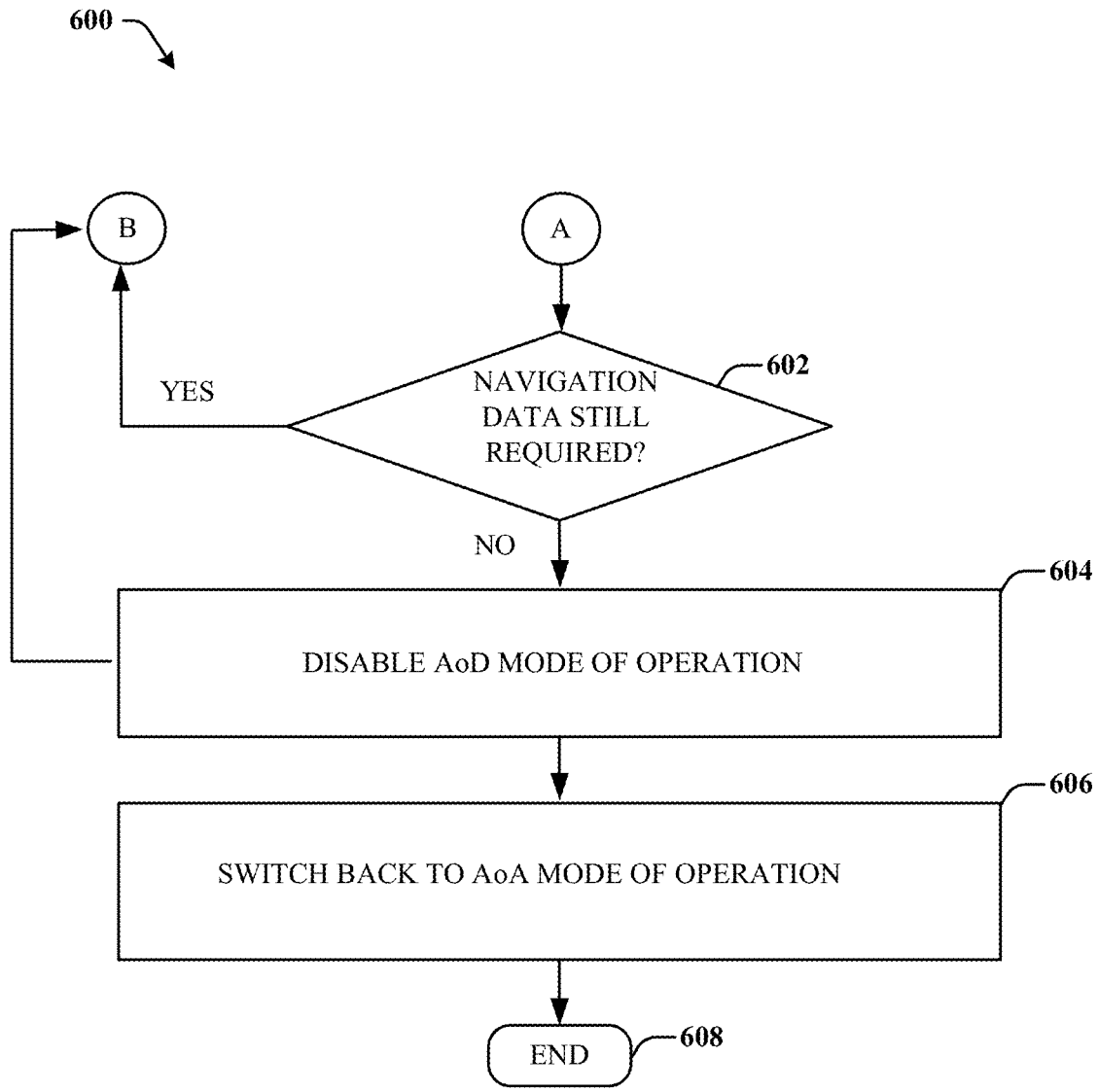

FIGS. 5-6 illustrate a flow diagram illustrating steps of operation of the system 300 in different modes. The process starts at block 502. At block 504, the locator beacon (for example, 302) operates in the AoA mode as a default mode of operation. In some examples, the default mode of operation can be the AoD mode.

At block 506, as the locator beacon 302 is operating in the AoA mode, the tracking and geofencing applications can be active. The navigation application is inactive. In simple words, the locator beacon 302 can generate tracking and geofencing information for the asset 304 or the mobile device 306 in vicinity. While operating in the AoA mode, all the antenna array elements may operate in the receive mode.

At block 508, the locator beacon 302 checks if a navigation request is received. The navigation request, generally, can be issued by the mobile device 306. If the navigation request received by the locator beacon 302, the control transfers to block 510. If no navigation request received, the locator beacon 302 continues to operate in the AoA mode of operation.

At block 510, in response to receiving the navigation request, the locator beacon 302 dynamically switch the antenna array elements to be able to support both the AoA and the AoD modes of operation contemporaneously. In other words, a set of antenna array element may operate in the transmit mode (to support AoD mode) while the other set may operate in the receive mode (to support AoA mode). The dynamic switching of the antenna array elements depends upon the mode of operation of the locator beacon 302.

At block 512, the locator beacon 302 switches to the AoD mode of operation. In an example, when switching to the AoD mode, the locator beacon 302 may continue to operate in the AoA mode of operation. The control then transfers to block 602 of FIG. 6.

At block 602, the locator beacon 302 checks if the navigation data is still required. The locator beacon 302, in some embodiment, may wait for predefined amount of time before switching back to the AoA mode. For example, after every 100 ms (approx.), the locator beacon 302 checks if the mode switching request received. In response to determining that the navigation data is still required, the locator beacon 302 goes back to block 508 to see if the navigation request is received. In case of negative determination, the control transfers to block 604.

At block 604, the locator beacon 302 disables the AoD mode of operation. The AoD mode can be disabled based on determining the payload of the packet received by the locator beacon 302.

At block 606, the locator beacon 302 switches back to AoA mode of operation. Now, all the antenna array elements may come back to the receive mode. This switching of the modes of the locator beacon 302 may not be limited to AoA to AoD mode. In some examples, the switching can be from AoD to AoA mode.

The process ends at block 608.

Figure 7:
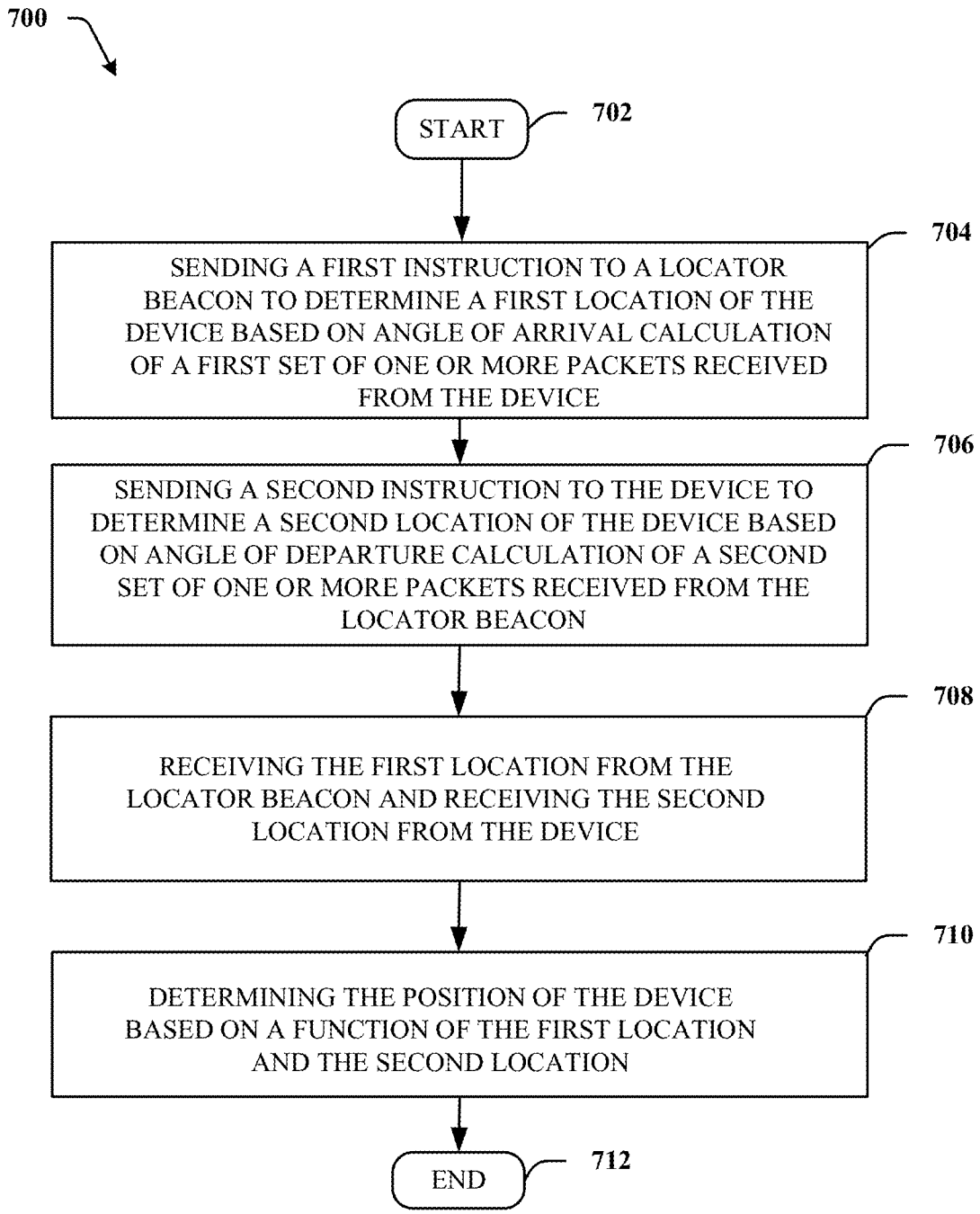
FIG. 7 illustrates a flow diagram representing a method of operation of a location system for determining a position of a device, according to one or more embodiments described herein.

FIG. 7 illustrates an exemplary embodiment of a method 700 of operation of a location system for determining a position of a device, according to one or more embodiments described herein. The method 700 starts at step 702. At step 704, a processor of the location system sends a first instruction to a locator beacon 302 (shown in FIG. 3) to determine a first location of the device based on angle of arrival calculation of a first set of one or more packets received from the device. The device herein can be the mobile device 306, the asset 304, or other electronic devices. The angle or arrival calculation corresponds to the AoA mode of operation of the locator beacon 302.

At step 706, the processor can send a second instruction to the device to determine a second location of the device based on angle of departure calculation of a second set of one or more packets received from the locator beacon 302. The angle or departure calculation corresponds to the AoD mode of operation of the locator beacon 302. In yet another embodiment, the processor may send the second instruction for determining the second location of the device upon receiving the trigger signal or the navigation request, as already explained earlier.

At step 708, the processor can receive the first location from the locator beacon 302 and receiving the second location from the device. The first instruction and the second instruction coordinate the angle of arrival calculation and the angle of departure calculation to occur at different times. The processing control can then be transferred to step 710.

At step 710, the processor then determines the position of the device based on a function of the first location and the second location. In one or more examples, the first location may represent the tracking and geofencing information of the device. Similarly, the second location may represent the navigation information of the device.

Figure 8:
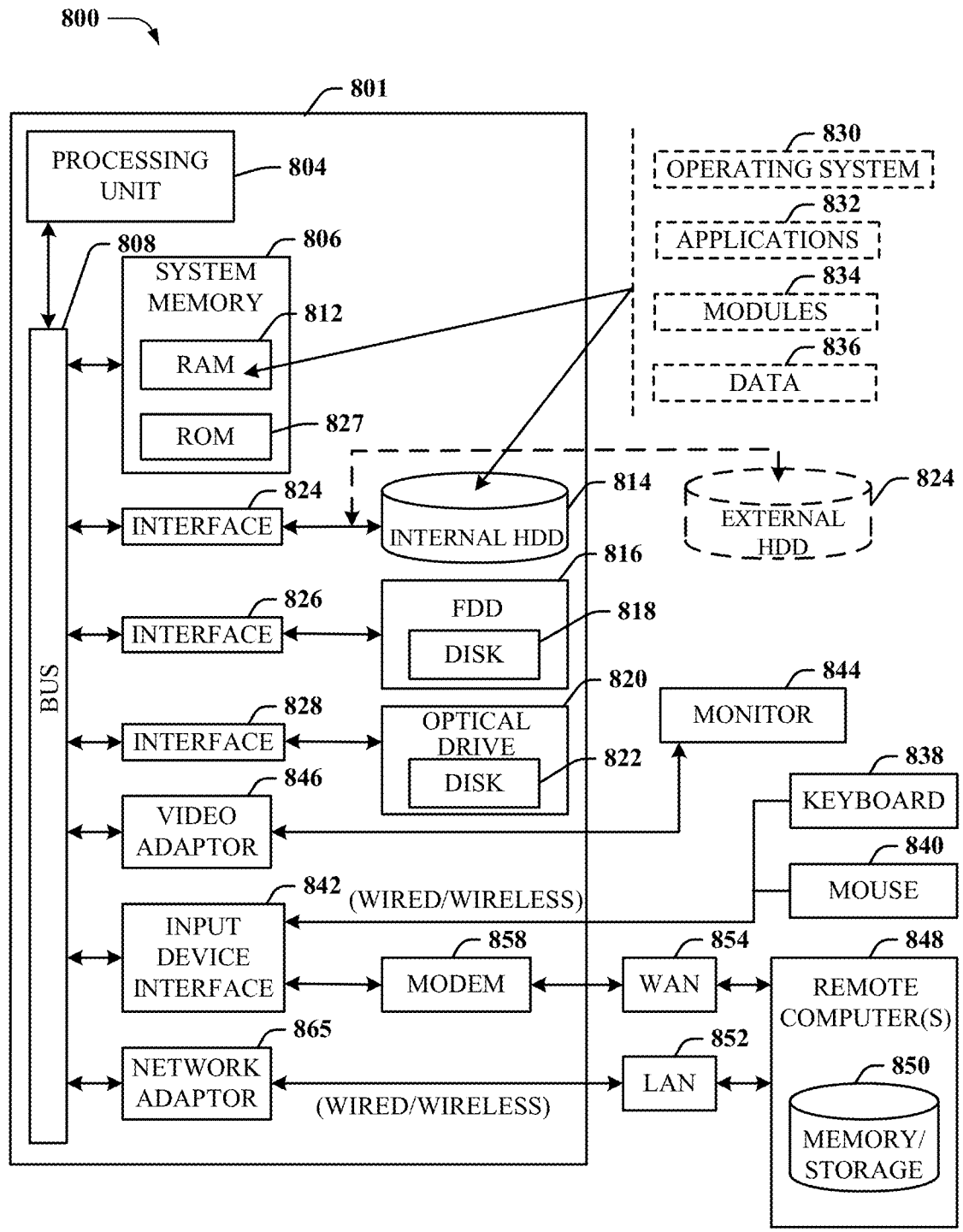
FIG. 8 illustrates a schematic view of another example electronic device used for performing tracking, geofencing and navigation, in accordance with another example embodiment.

FIG. 8 illustrates a schematic view of another example of an electronic device 801, in accordance with another example embodiment described herein. According to some example embodiments, the electronic device 801 illustrated in FIG. 8 can correspond to the assets (104, 110), the locator beacons (102-1 to 102-N and 108-1 to 108-N), the asset 200, and/or the mobile device 306, as described in reference to FIGS. 1-7.

Referring now to FIG. 8, there is illustrated a block diagram of operable to execute the functions and operations performed in the described example embodiments. In some example embodiments, the electronic device 801 can provide networking and communication capabilities between a wired or wireless communication network and a server and/or communication device. In order to provide additional context for various aspects thereof, FIG. 8 and the following discussion are intended to provide a brief, general description of a suitable computing environment in which the various aspects of the embodiments can be implemented to facilitate the establishment of a transaction between an entity and a third party. While the description above is in the general context of computer-executable instructions that can run on one or more computers, those skilled in the art will recognize that the various embodiments also can be implemented in combination with other program modules and/or as a combination of hardware and software.

According to said example embodiments, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, mini-computers, mainframe computers, as well as personal computers, hand-held computing devices, microprocessor-based or programmable consumer electronics, and the like, each of which can be operatively coupled to one or more associated devices.

The illustrated aspects of the various embodiments can also be practiced in distributed computing environments where certain tasks are performed by remote processing devices that are linked through a communications network. In a distributed computing environment, program modules can be located in both local and remote memory storage devices.

In accordance with some example embodiments, computing devices typically include a variety of media, which can include computer-readable storage media or communications media, which two terms are used herein differently from one another as follows.

According to some example embodiments, a computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CDROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

In some examples, communications media can embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference to FIG. 8, implementing various aspects described herein with regards to the end-user device can comprise the electronic device 801 comprising a processing unit 804, a system memory 806 and a system bus 808. The system bus 808 can be configured to couple system components including, but not limited to, the system memory 806 to the processing unit 804. In some example embodiments, the processing unit 804 can be any of various commercially available processors. To this end, in some examples, dual microprocessors and other multi-processor architectures can also be employed as the processing unit 804.

According to some example embodiments, the system bus 808 can be any of several types of bus structure that can further interconnect to a memory bus (with or without a memory controller), a peripheral bus, and a local bus using any of a variety of commercially available bus architectures. In some examples, the system memory 806 can comprise, read-only memory (ROM) 827 and random-access memory (RAM) 812. According to some example embodiments, a basic input/output system (BIOS) is stored in a non-volatile memory 827 such as ROM, EPROM, EEPROM, which BIOS contains the basic routines that help to transfer information between elements within the computing device 801, such as during start-up. The RAM 812 can also comprise a high-speed RAM such as static RAM for caching data.

According to some example embodiments, the computing device 801 can further comprise an internal hard disk drive (HDD) 814 (e.g., EIDE, SATA), which internal hard disk drive 814 can also be configured for external use in a suitable chassis (not shown), a magnetic floppy disk drive (FDD) 816, (e.g., to read from or write to a removable diskette 818) and an optical disk drive 820, (e.g., reading a CD-ROM disk or, to read from or write to other high capacity optical media such as the DVD). In some examples, the hard disk drive 814, magnetic disk drive 816 and optical disk drive 820 can be connected to the system bus 808 by a hard disk drive interface 824, a magnetic disk drive interface 826 and an optical drive interface 828, respectively. According to some example embodiments, the interface 824 for external drive implementations can comprise, at least one or both of Universal Serial Bus (USB) and IEEE 1394 interface technologies. Other external drive connection technologies are within contemplation of the subject embodiments.

According to some example embodiments described herein, the drives and their associated computer-readable media provide nonvolatile storage of data, data structures, computer-executable instructions, and so forth. For the electronic device 801 the drives and media accommodate the storage of any data in a suitable digital format. Although the description of computer-readable media above refers to a HDD, a removable magnetic diskette, and a removable optical media such as a CD or DVD, it may be appreciated by those skilled in the art that other types of media which are readable by an electronic device 801, such as zip drives, magnetic cassettes, flash memory cards, cartridges, and the like, can also be used in the example operating environment, and further, that any such media can contain computer-executable instructions for performing the methods of the disclosed embodiments.

In some example embodiments, a number of program modules can be stored in the drives and RAM 812, including an operating system 830, one or more application programs 832, other program modules 834 and program data 836. To this end, in some examples, all or portions of the operating system, applications, modules, and/or data can also be cached in the RAM 812. It is to be appreciated that the various embodiments can be implemented with various commercially available operating systems or combinations of operating systems.

According to some example embodiments, a user can enter commands and information into the computing device 801 through one or more wired/wireless input devices, e.g., a keyboard and a pointing device, such as a mouse 840. Other input devices (not shown) may include a microphone, an IR remote control, a joystick, a game pad, a stylus pen, touch screen, or the like. In some examples, these and other input devices are often connected to the processing unit 804 through an input device interface 842 that is coupled to the system bus 808, but can be connected by other interfaces, such as a parallel port, an IEEE 1384 serial port, a game port, a USB port, an IR interface, etc.

According to some example embodiments, a monitor 844 or other type of display device can also be connected to the system bus 808 through an interface, such as a video adapter 846. In addition to the monitor 844, the computing device 801 can also comprise other peripheral output devices (not shown), such as speakers, printers, etc.

According to some example embodiments, the computing device 801 can operate in a networked environment using logical connections by wired and/or wireless communications to one or more remote computers, such as a remote computer(s) 848. In some examples, the remote computer(s) 848 can be a workstation, a server computer, a router, a personal computer, portable computer, microprocessor-based entertainment device, a peer device or other common network node, and typically includes many or all of the elements described relative to the computer, although, for purposes of brevity, only a memory/storage device 850 is illustrated. According to some example embodiments, the logical connections depicted include wired/wireless connectivity to a local area network (LAN) 852 and/or larger networks, e.g., a wide area network (WAN) 854. Such LAN and WAN networking environments are commonplace in offices and companies, and facilitate enterprise-wide computer networks, such as intranets, all of which may connect to a global communications network, e.g., the Internet.

In some examples, when used in a LAN networking environment, the computing device 801 can be connected to the LAN 852 through a wired and/or wireless communication network interface or adapter 856. The adapter 856 may facilitate wired or wireless communication to the LAN 852, which may also include a wireless access point disposed thereon for communicating with the wireless adapter 856.

In alternate examples, when used in a WAN networking environment, the computing device 801 can include a modem 858, or can be connected to a communications server on the WAN 854 or has other means for establishing communications over the WAN 854, such as by way of the Internet. The modem 858, which can be internal or external and a wired or wireless device, is connected to the system bus 808 through the input device interface 842. In a networked environment, program modules depicted relative to the computer, or portions thereof, can be stored in the remote memory/storage device 850. It will be appreciated that the network connections shown are exemplary and other means of establishing a communications link between the computers can be used.

According to some example embodiments, the computing device 801 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can further comprise at least Wi-Fi and Bluetooth™ wireless technologies. Thus, the communication can be a predefined structure as with a conventional network or simply an ad hoc communication between at least two devices.

In accordance with some example embodiments, Wi-Fi, or Wireless Fidelity, allows connection to the Internet from a couch at home, a bed in a hotel room, or a conference room at work, without wires. To this end, Wi-Fi referred herein, is a wireless technology similar to that used in a cell phone that enables such devices, e.g., computers, to send and receive data indoors and out; anywhere within the range of a base station. Wi-Fi networks use radio technologies called IEEE802.11 (a, b, g, n, ac, ax, ah etc.) to provide secure, reliable, fast wireless connectivity. Further, in accordance with some example embodiments described herein, a Wi-Fi network can be used to connect computers or the plurality of electronic devices 102-10N to each other, to the Internet, and to wired networks (which use IEEE802.3 or Ethernet). Wi-Fi networks operate in the unlicensed 2.4 and 5 GHz radio bands, at an 11 Mbps (802.11b) or 54 Mbps (802.11a) data rate, for example, or with products that contain both bands (dual band), so the networks can provide real-world performance similar to the basic "9BaseT" wired Ethernet networks used in many offices.

As used in this application, the terms "system," "component," "interface," and the like are generally intended to refer to a computer-related entity or an entity related to an operational machine with one or more specific functionalities. The entities disclosed herein can be either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. These components also can execute from various computer readable storage media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry that is operated by software or firmware application(s) executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. An interface can comprise input/output (I/O) components as well as associated processor, application, and/or API components.

Furthermore, the disclosed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, computer-readable carrier, or computer-readable media. For example, computer-readable media can include, but are not limited to, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor also can be implemented as a combination of computing processing units.

In the subject specification, terms such as "store," "data store," "data storage," "database," "repository," "queue", and substantially any other information storage component relevant to operation and functionality of a component, refer to "memory components," or entities embodied in a "memory" or components comprising the memory. It will be appreciated that the memory components described herein can be either volatile memory or nonvolatile memory or can comprise both volatile and nonvolatile memory. In addition, memory components or memory elements can be removable or stationary. Moreover, memory can be internal or external to a device or component, or removable or stationary. Memory can comprise various types of media that are readable by a computer, such as hard-disc drives, zip drives, magnetic cassettes, flash memory cards or other types of memory cards, cartridges, or the like.

By way of illustration, and not limitation, nonvolatile memory can comprise read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated example aspects of the embodiments. In this regard, it will also be recognized that the embodiments comprise a system as well as a computer-readable medium having computer-executable instructions for performing the acts and/or events of the various methods.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can comprise, but are not limited to, RAM, ROM, EEPROM, flash memory or other memory technology, CD ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

On the other hand, communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communications media comprise wired media, such as a wired network or direct-wired connection, and wireless media such as acoustic, RF, infrared and other wireless media Further, terms like "user equipment," "user device," "mobile device," "mobile," station," "access terminal," "terminal," "handset," and similar terminology, generally refer to a wireless device utilized by a subscriber or user of a wireless communication network or service to receive or convey data, control, voice, video, sound, gaming, or substantially any data-stream or signaling-stream. The foregoing terms are utilized interchangeably in the subject specification and related drawings. Likewise, the terms "access point," "node B," "base station," "evolved Node B," "cell," "cell site," and the like, can be utilized interchangeably in the subject application, and refer to a wireless network component or appliance that serves and receives data, control, voice, video, sound, gaming, or substantially any data-stream or signaling-stream from a set of subscriber stations. Data and signaling streams can be packetized or frame-based flows. It is noted that in the subject specification and drawings, context or explicit distinction provides differentiation with respect to access points or base stations that serve and receive data from a mobile device in an outdoor environment, and access points or base stations that operate in a confined, primarily indoor environment overlaid in an outdoor coverage area. Data and signaling streams can be packetized or frame-based flows.

Furthermore, the terms "user," "subscriber," "worker", "customer," "consumer," and the like are employed interchangeably throughout the subject specification, unless context warrants particular distinction(s) among the terms. It should be appreciated that such terms can refer to human entities, associated devices, or automated components supported through artificial intelligence (e.g., a capacity to make inference based on complex mathematical formalisms) which can provide simulated vision, sound recognition and so forth. In addition, the terms "wireless network" and "network" are used interchangeable in the subject application, when context wherein the term is utilized warrants distinction for clarity purposes such distinction is made explicit.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

In addition, while a particular feature may have been disclosed with respect to only one of several implementations, such feature may be combined with one or more other features of the other implementations as may be desired and advantageous for any given or particular application. Furthermore, to the extent that the terms "includes" and "including" and variants thereof are used in either the detailed description or the claims, these terms are intended to be inclusive in a manner similar to the term "comprising."

The above descriptions of various embodiments of the subject disclosure and corresponding figures and what is described in the Abstract, are described herein for illustrative purposes, and are not intended to be exhaustive or to limit the disclosed embodiments to the precise forms disclosed. It is to be understood that one of ordinary skill in the art may recognize that other embodiments having modifications, permutations, combinations, and additions can be implemented for performing the same, similar, alternative, or substitute functions of the disclosed subject matter, and are therefore considered within the scope of this disclosure. Therefore, the disclosed subject matter should not be limited to any single embodiment described herein, but rather should be construed in breadth and scope in accordance with the claims below.

It may be noted that, as used in this specification and the appended claims, the singular forms "a," "an" and "the" comprise plural referents unless the content clearly dictates otherwise.

References within the specification to "one embodiment," "an embodiment," "embodiments", or "one or more embodiments" are intended to indicate that a particular feature, structure, or characteristic described in connection with the embodiment is comprised in at least one embodiment of the present disclosure. The appearance of such phrases in various places within the specification are not necessarily all referring to the same embodiment, nor are separate or alternative embodiments mutually exclusive of other embodiments. Further, various features are described which may be exhibited by some embodiments and not by others.

It should be noted that, when employed in the present disclosure, the terms "comprises," "comprising," and other derivatives from the root term "comprise" are intended to be open-ended terms that specify the presence of any stated features, elements, integers, steps, or components, and are not intended to preclude the presence or addition of one or more other features, elements, integers, steps, components, or groups thereof.

Detailed embodiments are disclosed herein; however, it is to be understood that the disclosed embodiments are merely exemplary, which may be embodied in various forms. Therefore, specific structural and functional details disclosed herein are not to be interpreted as limiting, but merely as a basis for the claims.

While it is apparent that the illustrative embodiments described herein disclosed fulfill the objectives stated above, it will be appreciated that numerous modifications and other embodiments may be devised by one of ordinary skill in the art. Accordingly, it will be understood that the appended claims are intended to cover all such modifications and embodiments, which come within the spirit and scope of the present disclosure.

What is claimed is:

1. A location system comprising:
a memory to store computer-executable instructions; and
a processor to execute the computer-executable instructions to perform operations comprising:
sending a first instruction to a locator beacon to determine a first location of an asset based on angle of arrival calculation of a first set of one or more packets received from the asset;
in response to receiving a navigation request from a device, sending a second instruction to the device to determine a second location of the device based on angle of departure calculation of a second set of one or more transmitted by the locator beacon, wherein the first instruction and the second instruction coordinate the angle of arrival calculation and the angle of departure calculation to occur at different times; and
receiving the first location the second location for determining a position of the device,
wherein the second set of one or more packets comprises navigation data for navigation of the device to the asset.

2. The location system of claim 1, wherein a default mode for the locator beacon is angle of arrival (AoA) mode and for the device is angle of departure (AoD) mode.

3. The location system of claim 2, wherein, in the AoA mode, the locator beacon is configured to operate in a receive mode.

4. The location system of claim 2, wherein, in the AoD mode, the device is configured to operate in a transmit mode.

5. The location system of claim 2, wherein the location system switches from the AoA mode to the AoD mode based on receiving a trigger signal.

6. The location system of claim 2, wherein the location system switches from the AoA mode to the AoD mode based on receiving a trigger signal, and wherein the switching between the AoA mode and the AoD mode is periodic and occurs at a predefined interval.

7. The location system of claim 6, wherein the periodic switching between the AoA mode and the AoD mode is configurable.

8. The location system of claim 1, wherein the locator beacon receives a third instruction from a central server to determine a third location of the asset based on angle of arrival calculation of a third set of one or more packets received from the asset.

9. The location system of claim 8, wherein the locator beacon transmits packets comprising of navigation data to the device, wherein the navigation data includes information pertaining to current location of the device and the third location of the asset.

10. The location system of claim 9, wherein the device is configured to process the navigation data and present a path or a map or a shortest route on a display of the device to reach to the third location of the asset from the current location.

11. A method comprising:
sending, by a central server, a first instruction to a locator beacon to determine a first location of an asset based on angle of arrival calculation of a first set of one or more packets received from the asset;
in response to receiving a navigation request from a device, sending, by the central server, a second instruction to the device to determine a second location of the device based on angle of departure calculation of a second set of one or more packets transmitted by the locator beacon, wherein the first instruction and the second instruction coordinate the angle of arrival calculation and the angle of departure calculation to occur at different times; and
receiving, by the central server, the first location and the second location for determining a position of the device,
wherein the second set of one or more packets comprises navigation data allowing navigation of the device to the asset.

12. The method of claim 11, wherein a default mode for the locator beacon is angle of arrival (AoA) mode and for the device is angle of departure (AoD) mode.

13. The method of claim 12, wherein in the AoA mode, the locator beacon is configured to operate in a receive mode.

14. The method of claim 12, wherein in the AoD mode, the device is configured to operate in a transmit mode.

15. The method of claim 12, further comprising switching from the AoA mode to the AoD mode based on receiving a trigger signal.

16. The method of claim 15, wherein the periodic switching between the AoA mode and the AoD mode is configurable.

17. The method of claim 12, further comprising switching from the AoA mode to the AoD mode based on receiving a trigger signal, wherein the switching between the AoA mode and the AoD mode is periodic and occurs at a predefined interval.

18. The method of claim 11, wherein the locator beacon is configured to receive a third instruction from the central server to determine a third location of the asset based on angle of arrival calculation of a third set of one or more packets received from the asset.

\* \* \* \* \*